Figure 1:
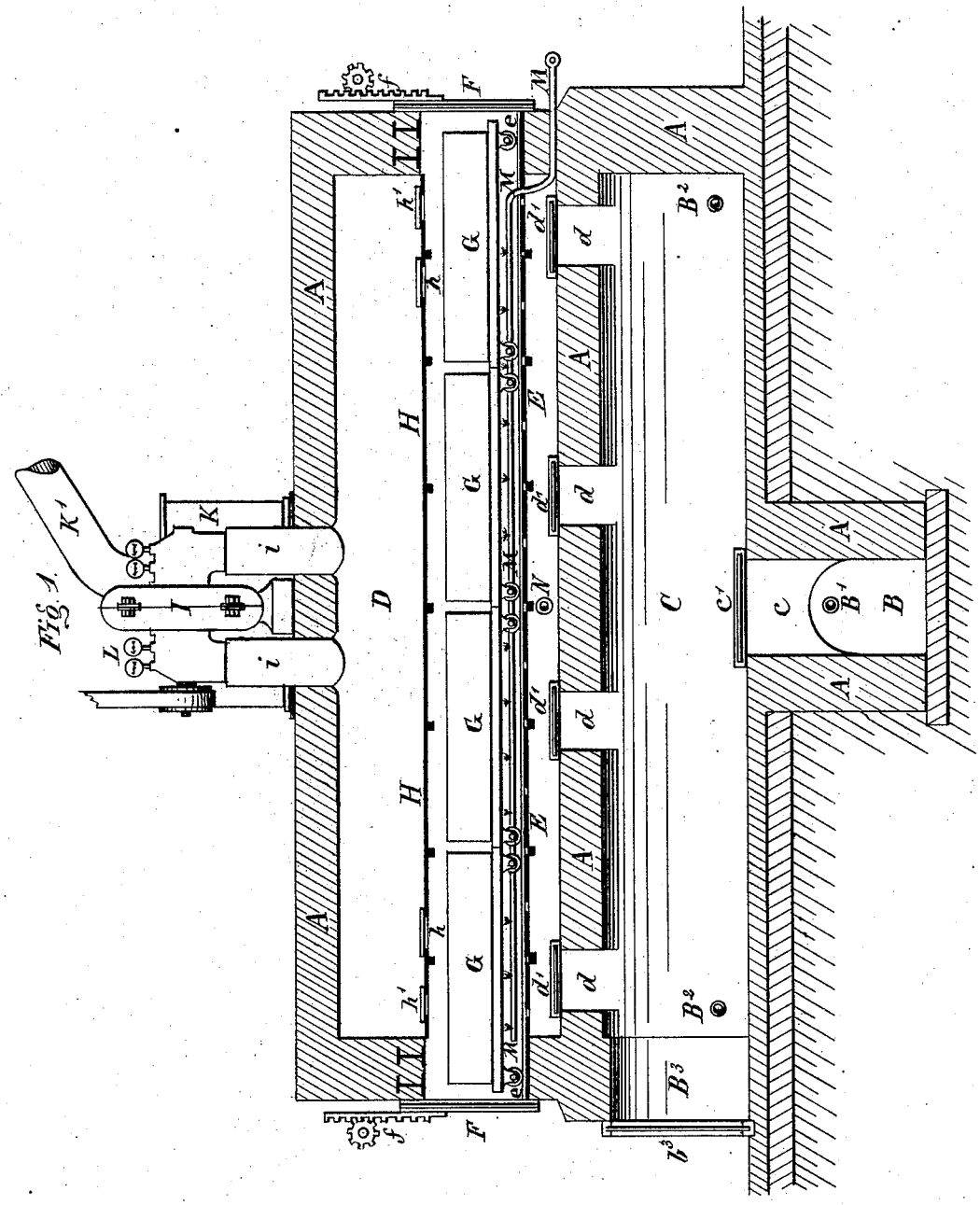

H. P. O. LISSAGARAY.
APPARATUS FOR CONVERTING NITROGENOUS SUBSTANCES INTO FERTILIZERS.

No. 184,162. Patented Nov. 7, 1876.

Witnesses
Inventor
Henri P. O. Lissagaray

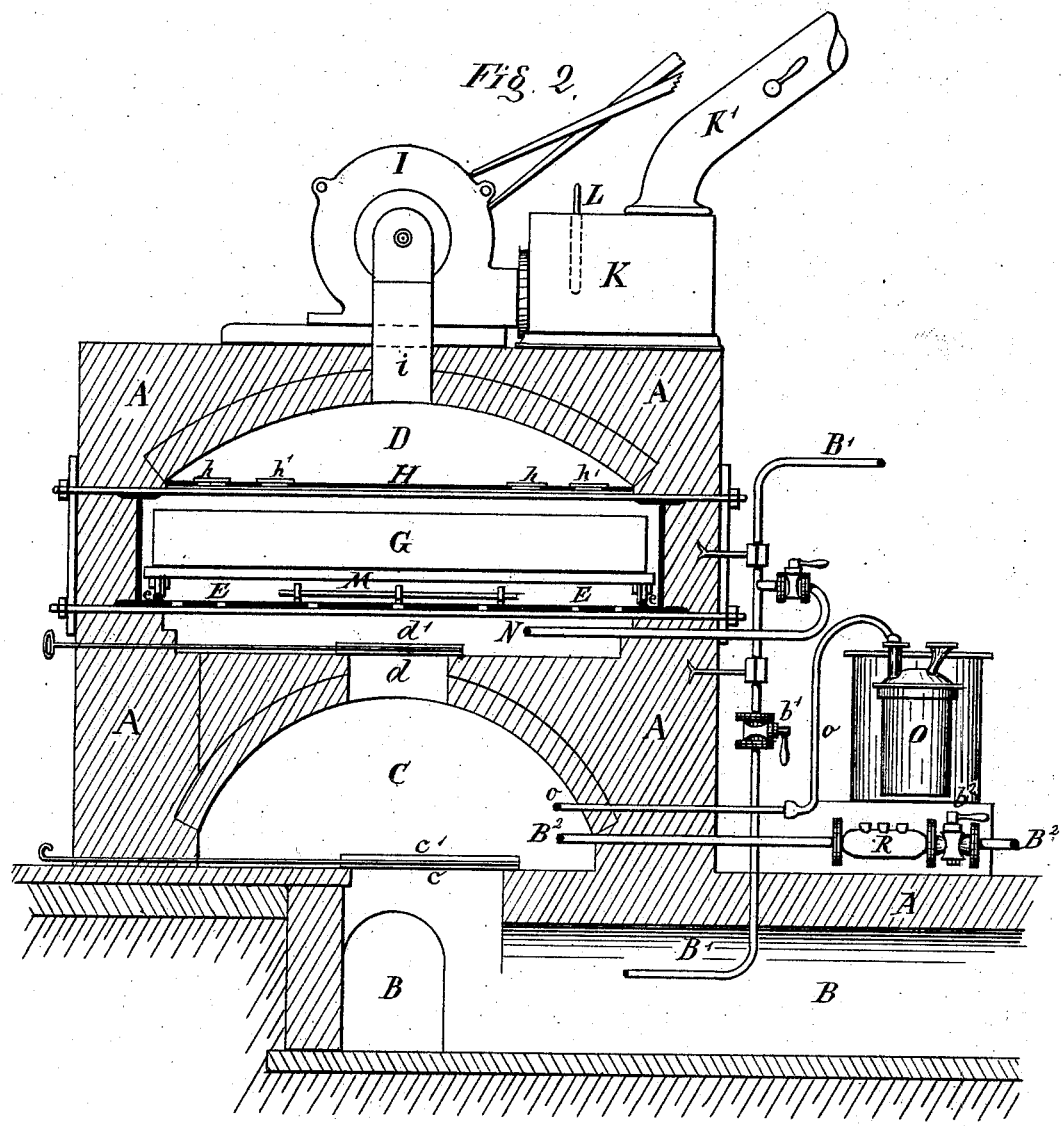

UNITED STATES PATENT OFFICE.

HENRI P. O. LISSAGARAY, OF PANTIN, NEAR PARIS, FRANCE.

IMPROVEMENT IN APPARATUS FOR CONVERTING NITROGENOUS SUBSTANCES INTO FERTILIZERS.

Specification forming part of Letters Patent No. 184,162, dated November 7, 1876; application filed September 4, 1876.

*To all whom it may concern:*

Be it known that I, HENRI PROSPER OLIVIER LISSAGARAY, of Pantin, near Paris, in the Republic of France, have invented certain new and useful Improvements in an Apparatus for Converting Nitrogenous Substances into a Fertilizer, of which the following is a specification:

My invention has for its object the conversion of leather, horn feathers, or analogous nitrogenous substances of animal origin, into a fertilizer or fertilizers; and consists in a novel apparatus of peculiar construction, in which said nitrogenous substances are converted.

But that my invention may be fully understood I will briefly describe the manner or method by which such substances are treated prior to their being introduced into the apparatus for final conversion. The treatment consists in a partial conversion, and is based, together with their final conversion in the apparatus, upon three distinct operations, to wit: first, the immersion or steeping of the leather in a diluted sulphuric-acid bath holding sulphates or other mineral salts in solution, such as sulphate of alumina, or alum, or salts of manganese; second, after immersion or steeping, and when the leather has absorbed about half its weight of the solution, it is partially dried in the open air, for the purpose of concentrating the acid, and is then subjected to a current of saturated steam, or saturated steam and hot air, in combination with superheated steam; and, third, the material, having become brittle and adapted to be crushed or pulverized, is then comminuted by means of any suitable apparatus, and packed ready for use as a fertilizer.

The treatment is carried out in the following manner: The leather is first steeped in water acidulated with monohydrated sulphuric acid, to which has been added a sulphate or other mineral salt, the solution being in the following proportions: Sulphuric acid, 66° Baumé, twelve parts; ammoniacal alum, twelve parts; water, seventy-six parts.

Of course, it will be understood that these proportions may be varied according to the substances to be treated. By experience, however, I have found that these proportions answer all the purposes in the treatment of leather. The steeping or saturation is effected by placing the leather in wicker baskets and suspending the latter in vats or tanks (or a vat or tank) containing the above solution until the material has absorbed about one-half its weight of the solution, which takes place after an immersion of from one to five minutes, when the material is withdrawn and spread out in the open air and partially dried. By this partial drying or evaporation of the water of the solution, the acid thereof is concentrated, and a chemical reaction at once takes place, which hardens the material and renders it brittle. This chemical reaction is further aided, hastened, and completed by subjecting the leather to the action of saturated steam, or saturated steam and hot air, in combination with superheated steam, to raise the temperature of from 120° to 250° centigrade.

The peculiar characteristics of the reaction, when effected as above described, are as follows: First, the leather is partially fused, the fusion always beginning in the interior or center of the mass, spreading toward the exterior or outside thereof; second, with the fusion of the mass the formation of bubbles takes place, owing to the gases generated, which tend to escape, and, consequently, cause the outer still solid surfaces to distend or swell, and, as the fusion advances, the outer surface is ruptured or fissured, and through these fissures the fused bubbles escape and solidify on the outer surface in the form of hollow spheres, thus forming layer upon layer of bubbles until the whole is fused.

These characteristics are the more pronounced as the fusion in the interior is more complete, and the consequent pressure on the outer crust greater, and also as the outer crust offers a greater resistance to the pressure of the fused mass from within, provided, however, that the resistance of the outer crust is not greater than the pressure from within. Nitrogenous substances, when so treated, become highly inflammable or combustible so soon as the fusion and consequent drying takes place. This combustion would take place when in contact or under the influence of the heat while under treatment, or when the mass so treated is brought in contact with atmospheric air; it is, therefore, of the utmost importance that all such atmospheric air should be carefully excluded from the substances while under treatment, and should not be exposed thereto until sufficiently cooled off.

To avoid the spontaneous combustion of the leather while undergoing the chemical reaction above described, I add to the sulphuric-acid solution a sulphate or other mineral salt, such as alum, sulphate of alumina, or analogous sulphates or mineral salts, which not only considerably retard this spontaneous combustion, but also impart to the outer surface of the material a greater resistance to the fusion from within. By making this solution or steeping-bath of given or determined quantities, I am enabled to control and graduate the two opposing actions of the sulphuric acid and the sulphate or mineral salt, so as to bring the material to a state of fusion and blistering or bubbling simultaneously, which adapts it to be readily comminuted.

From what has been said above, it is of the greatest importance that the action of the heat upon the leather, which has absorbed about one-half of its own weight of the above-described solution, should be exerted within the limits of 120° to 250° centigrade, care being taken to prevent all contact of the atmospheric air with said material, as such contact would rapidly determine the combustion of the organic matter. Besides this, the chemical reaction should always take place in presence of a certain quantity of water or moisture, either in the form of saturated steam introduced in variable quantities, according to the condition of the mass and the chemical constitution of the solution; or this water may be introduced in the form of spray, or by means of a series of small jets, the amount of moisture being determined or regulated by the conditions above enumerated, as well as by the degree of heat applied and the length of time the material has been subjected to the heat.

In the accompanying drawings, Figure 1 is a longitudinal section, and Fig. 2 a vertical transverse section, of the apparatus constructed according to my invention.

A A is the masonry or brick-work or casing. B is an arched or other flue, through which the heated air and gases from the furnace of a steam-generator, as well as the saturated steam, are admitted to the chamber C. The flue B may be connected directly with the furnace of the generator, and in this manner all the products of combustion may be utilized in the heating of the material.

The saturated steam is admitted into flue B through pipe $B^1$, and both the commingled heated air and saturated steam escape into the arched chamber C through suitable openings or an opening, $c$, provided with a damper, $c'$. In this chamber C the temperature of the heated air and saturated steam is increased by admitting superheated steam through pipe $B^2$, which is connected with the superheater. From the chamber C the heated air and products of combustion and the saturated steam, to which the requisite temperature has been imparted by means of the superheated steam, are allowed to penetrate into the chamber D through a series of openings, $d$, each provided with a damper, $d'$.

The chamber D is provided with a perforated metallic diaphragm, E, forming a double floor, raised some distance above the openings $d$, upon which a track or tracks, $e$, are laid. The leather or other nitrogenous substance, after having been steeped or soaked and partially dried, is loaded or placed into boxes mounted on trucks, which are then run into the heating-chamber D through suitable doors or a door, F, operated, by preference, by means of a rack and pinion, $f$, though any other means to open and close said doors may be employed.

The trucks G, when loaded, are run into the chamber D upon the rails $e$, and the doors are then tightly closed, and when the operation or treatment is effected these trucks are run out at the opposite end of the chamber, thus permitting the introduction of a fresh set of trucks loaded with material to be treated.

The chamber D is further provided with a diaphragm, H, having a series of openings, $h$, each provided with a damper, $h'$, for the purpose of regulating the draft created by the exhaust-fan I, driven from any suitable motor, and which serves to carry off the heated air and steam and the gases generated by the treatment of the material, and which escape, through pipes $i\ i$, into the chest K, and from thence, through pipe $K'$, into the atmosphere. The chest K is provided with a thermometer, L, to ascertain the temperature of the escaping gases, and to regulate the same by its indications. This regulation of the heat is effected by controlling the draft by means of the dampers $h'$ in the diaphragm H, and, further, by means of the dampers $d'\ c'$ and the stopcocks $b^1\ b^2$, to control the admission of the heated air and saturated steam, and also the admission of the superheated steam into the heating-chamber D. The temperature is still further regulated by the admission of atmospheric air into the chamber C through a suitable aperture, $B^3$, which is also provided with a damper, $b^3$. This opening also serves the purpose of cleaning out the flue B and chambers.

The pipe $K'$ is provided with a suitable valve or damper to regulate the escape of the gases.

N is a steam-pipe, which serves to introduce saturated steam directly under the perforated plate E, to drive out the atmospheric air and supply the required moisture to prevent the substances under treatment from igniting under the action of the heat. M is another pipe, located longitudinally of the chamber D, immediately under the trucks G. This pipe is provided with a series of small perforations, through which a jet of water, or water in the form of spray, may be injected in the chamber D and upon the under face of the trucks G, to supply any desired amount of moisture, as well as for the purpose of cooling the trucks after the treatment of the material has been completed, and before bringing such material in contact with atmospheric air.

O is an apparatus or generator, which serves to supply a certain quantity of chlorine, which, being introduced into the chamber C through pipe o, there commingles with the products of combustion, or heated air and steam, and with them enters the chamber D, to mingle with the gases generated in such chamber by the action of the heat upon the material under treatment, and serves to counteract the deleterious effect of such gases.

By means of this construction and arrangement of apparatus I obtain the following advantages: The heating of the material to be treated is effected by the simultaneous action, first, of the heated air and gases from the furnace of a steam-generator; secondly, by the action of the saturated steam obtained from said generator, the pressure of which is maintained at from five to six atmospheres; thirdly, by the action of this same steam when superheated by a special apparatus to above 400° centigrade.

The variation and intensity of these three elements by means of the devices already described may be controlled and regulated, so that variations *ad libitum* may be obtained, not only in the absolute weight of the mixed saturated and superheated steams, but also in the relative proportions of the weight of said saturated and superheated steams.

R is a thermostat or thermostats to ascertain the temperature of the superheated steam.

Having now described my invention, what I claim, and desire to secure by Letters Patent, is—

1. The apparatus consisting, essentially, of the chambers C D and flue B, each provided with suitable apertures $c\ d$ and dampers $c'\ d'$, in combination with the steam-pipes $B^1\ B^2$, the pipes $i\ i$, fan I, chest K, and pipe $K'$, and a steam generator and superheater, substantially as described, and operating as set forth.

2. The chamber D, having a perforated false bottom or diaphragm, E, inlet and outlet apertures F, and a tramway or track, for the purpose set forth, in combination with the chamber C and the steam-pipes $B^2$ N and the pipe M, constructed in the manner and for the purpose substantially as set forth.

3. The chamber D, provided with a diaphragm or partition, H, having apertures $h$ and dampers $h'$, in combination with the pipes $i\ i$ and fan I, substantially as described, for the purpose specified.

4. The chamber D, having diaphragm H, provided with apertures and dampers $h\ h'$, the fan I, and pipes $i$, in combination with the chest K, having thermometer L, and the pipe $K'$, having a suitable valve, all constructed and operating substantially as described, for the purpose set forth.

5. The combination of the chambers C D and flue B, the steam-pipes $B^1\ B^2$, and the furnace of a generator with the aperture $B^3$ and damper $b^3$ and an exhaust-fan, all constructed substantially as described, for the purpose specified.

In witness that I claim the foregoing I have hereunto set my hand this 5th day of July, 1876.

HENRI PROSPER OLIVIER LISSAGARAY.

Witnesses:
    ROBT. M. HOOPER,
    FRÉDÉRIC WEIL.